United States Patent [19]

Stowe et al.

[11] 4,395,827

[45] Aug. 2, 1983

[54] CLEARANCE MEASURING METHOD AND APPARATUS

[75] Inventors: Bruce W. Stowe; Joseph C. Young, both of Cincinnati; Jerome P. Clark, Montgomery, all of Ohio

[73] Assignee: General Electric Company, Cincinnati, Ohio

[21] Appl. No.: 333,140

[22] Filed: Dec. 21, 1981

[51] Int. Cl.³ .............................................. G01B 7/14
[52] U.S. Cl. .............................. 33/181 R; 33/172 E; 33/169 R; 415/118
[58] Field of Search ............. 33/169 R, 172 E, 180 R, 33/181 R, 168 B; 415/9, 12, 118, 129, 130, 131, 133, 148

[56] References Cited

U.S. PATENT DOCUMENTS

| 2,367,513 | 1/1945 | Malhiot | 33/168 B |
|---|---|---|---|
| 2,554,171 | 5/1951 | Brunot et al. | 33/125 |
| 2,650,435 | 9/1953 | Kidd | 33/169 |
| 2,654,156 | 10/1953 | Boyer | 33/172 |
| 3,002,374 | 10/1961 | Jacobs | 73/37.5 |
| 3,190,125 | 6/1965 | Holz | 73/432 |
| 3,841,764 | 10/1974 | Snell et al. | 415/118 |
| 3,849,893 | 11/1974 | Ormsby | 33/181 R |
| 3,968,569 | 7/1976 | Faris | 33/169 R |
| 4,043,044 | 8/1977 | Whitehead et al. | 33/172 E |
| 4,063,167 | 12/1977 | Duly | 324/61 R |
| 4,298,312 | 11/1981 | Mackenzie et al. | 415/118 |
| 4,302,963 | 12/1981 | Collins | 415/118 |

Primary Examiner—Willis Little
Attorney, Agent, or Firm—Derek P. Lawrence

[57] ABSTRACT

A method and apparatus for obtaining a cold clearance measurement between a rotating member and a stationary member of a partially or fully assembled turbine, using measuring equipment which can be removed from within the turbine without requiring turbine disassembly.

28 Claims, 8 Drawing Figures

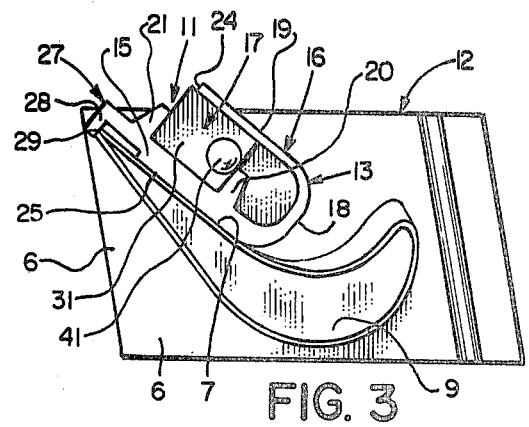
FIG. 3
FIG. 4
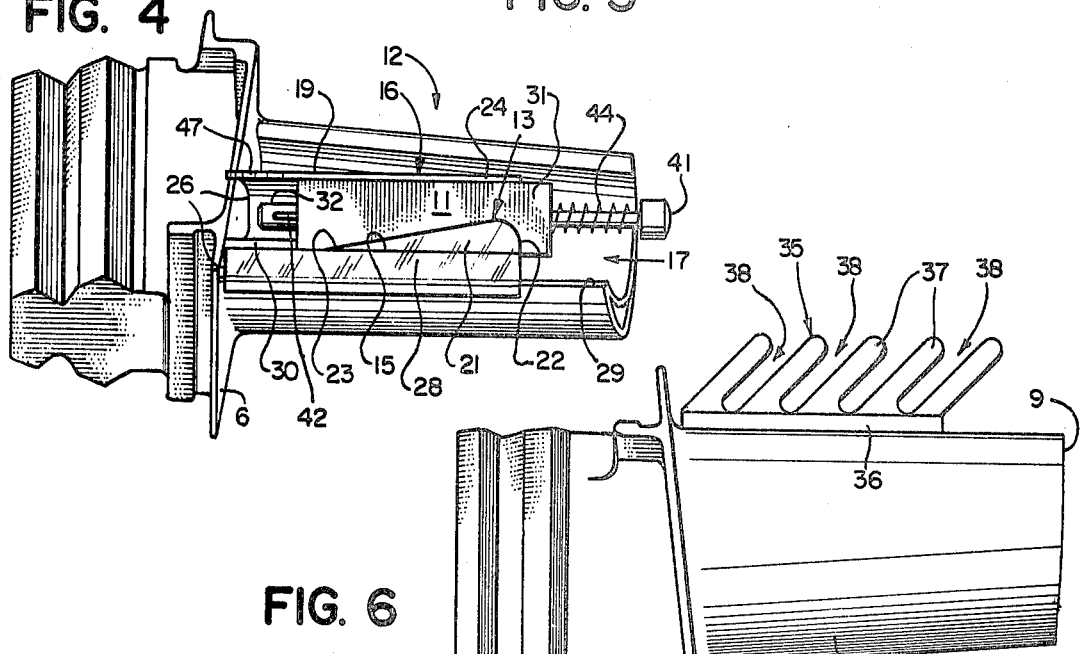
FIG. 6
FIG. 5
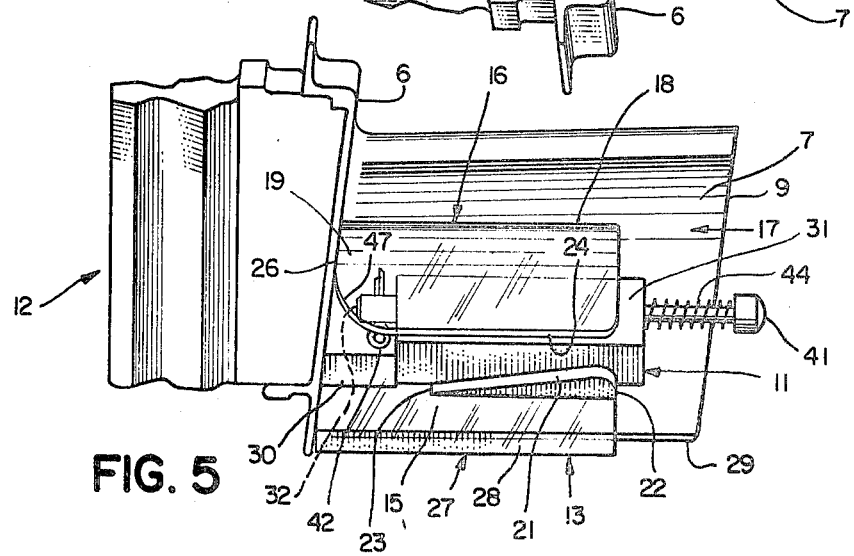

CLEARANCE MEASURING METHOD AND APPARATUS

BACKGROUND OF THE INVENTION

This invention relates generally to a clearance measuring method and apparatus, and more particularly, to a method and apparatus for measuring the clearance between a rotating member and a stationary member of a turbine or the like.

In order to assure proper performance of a turbine, such as a jet engine, it is important to establish proper clearance between the blades which form part of the rotating member of the turbine and the stationary member which encloses the rotating member to form an assembled combination. This clearance is generally established by measuring the clearance between these elements after their assembly, but prior to initial operation of the turbine (the cold clearance measurement). If this cold clearance measurement changes, or is not satisfactory, a proper running tip clearance will not be established and proper operation of the turbine will now be obtained.

To perform such a cold clearance measurement, the following steps are presently necessary. First, the rotor must be assembled by attaching the blades to the core of the rotor in the conventional manner. During this operation, at least one of the blades is fitted with a measuring device which will be used in obtaining the cold clearance measurement. The rotor (and blades) is then located within the casing so that the blades are located in the position which they will assume when the turbine is to be operated. At this time, after such a unit has been at least partially assembled, the clearance between the blades of the rotor and the inner wall of the casing is measured by appropriately monitoring the measuring device previously attached to one of the blades and by rotating the rotor through one or several rotations. After this alignment procedure is completed, it becomes necessary to remove the measuring device from within the assembled unit prior to initial operation of the turbine, since operation of a turbine which contains such a measuring device could seriously damage components of the turbine. To remove the measuring device from the assembled unit, it is necessary to completely disassemble the unit and detach the measuring device from the blade (or blades) to which it is attached. The unit is then reassembled, taking care not to change the alignment between the various components comprising the unit, so that the previously performed clearance measurement is not altered.

Although this method has proved satisfactory in obtaining a proper running tip clearance, this method presents several serious drawbacks, primarily due to the fact that after the cold clearance measurement is made it becomes necessary to completely disassemble the aligned unit to remove the measuring device used. This is an extremely time consuming procedure, involving substantial hours of highly skilled labor, in order to assure that the reassembled unit maintains the same clearance measurement as obtained initially. Moreover, since it is extremely important that the components of the unit be unchanged when reassembled, to maintain the original cold clearance measurement, a significant potential for error, and accordingly damage, is introduced into the assembly procedure.

Apparently recognizing these problems, a variety of devices and techniques have been developed which attempt to more easily measure such clearances, without having to disassemble components after such clearance measurements have been obtained. However, none of these devices or techniques also provide a means for obtaining a complete and continuous measurement of the distance between the rotating member and the inner wall of the stationary member, as has been found to be desirable in such applications.

It is therefore desirable to provide a method and apparatus for properly measuring the clearance between a rotating member and a stationary member of an assembled, or partially assembled turbine in a continuous and accurate manner, without requiring disassembly or alteration of turbine components after this clearance is established.

SUMMARY OF THE INVENTION

It is therefore an object of the present invention to provide an improved method and apparatus for measuring the clearance between a rotating member and a stationary member of a turbine or the like.

It is another object of the present invention to provide a method and apparatus for measuring the clearance between a rotating member and a stationary member of a turbine or the like which does not require the disassembly or alteration of assembled portions of the turbine after the clearance measurement has been made.

It is another object of the present invention to provide a method and apparatus for measuring the clearance between a rotating member and a stationary member of a turbine or the like which permits an accurate and continuous measurement of this clearance.

Briefly, these objects, as well as additional objects and advantages which will become apparent from the following specification and appended drawings and claims, are accomplished in accordance with the present invention by providing an improved system for attaching the measuring device to the blades associated with the rotating member.

In one embodiment, a retaining clip is provided for attachment to at least one blade of the rotating member, which retaining clip is capable of releasably retaining the measuring device to the blade in a manner which permits the clearance between the blade and stationary member to be measured. The measuring device may then be attached to the blade during assembly of the rotor and casing, and thereafter, a cold clearance measurement may be obtained, assuring proper alignment of these components. Thereafter, the measuring device is released from the retaining clip, and withdrawn from within the assembled rotor and casing through an aperture provided in the casing. By forming the retaining clip of a material which is capable of disintegration upon initial operation of a fully assembled turbine without adversely affecting the components comprising the turbine, removal of the measuring device and retaining clip from within the unit is accomplished without requiring the disassembly of turbine components after the cold clearance measurement has been obtained.

Generally, a cable extends between the measuring device attached to the blade of the rotor and measuring equipment which is located external to the casing. To properly support this cable in position during assembly and during the measurement procedure, a harness hanger or clip is provided which is attachable to the blades of the rotor as desired, and which includes means for engaging the cable and securely retaining the cable in position as needed.

BRIEF DESCRIPTION OF THE DRAWINGS

FIG. 3 is an end elevational view of a blade provided with a retaining clip for attaching a measuring device to the blade in accordance with the present invention.

FIG. 4 is a side elevational view of the blade, retaining clip and measuring device shown in FIG. 3.

FIG. 5 is a top plan view of the blade, retaining clip and measuring device shown in FIG. 3.

FIG. 6 is a side elevational view of a blade provided with a harness clip for retaining portions of a harness associated with the measuring device to the blade.

In the several views provided, like reference numerals denote similar structure.

DETAILED DESCRIPTION OF THE INVENTION

Figure 1:
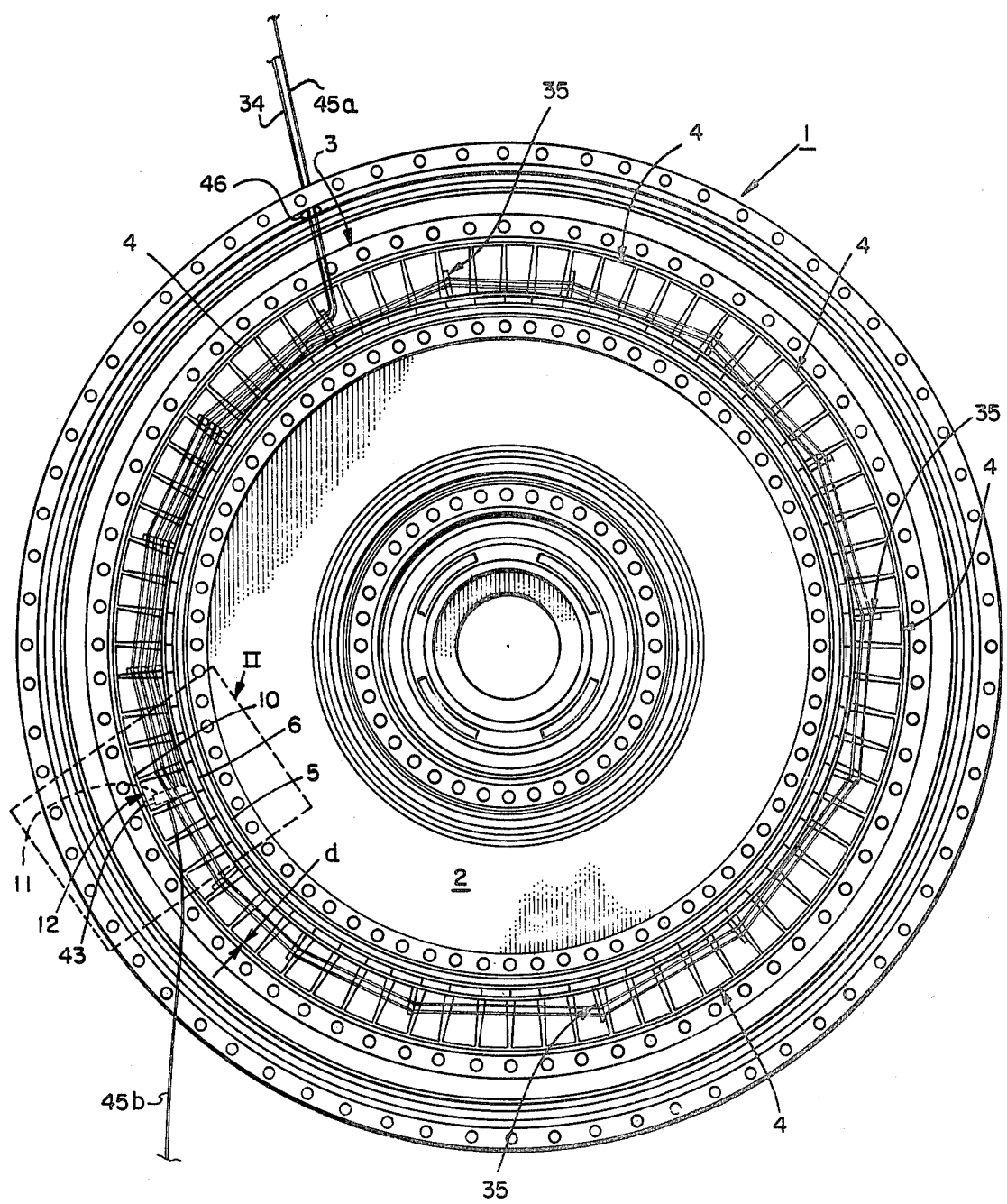
FIG. 1 is a side, elevational view of a partially assembled turbine which has been provided with the measuring system of the present invention.

Referring now to FIG. 1, a partially assembled unit 1 is shown which is illustrative of an environment in which the method and apparatus of the present invention may be used. As illustrated, the unit 1 generally comprises a centrally disposed, rotating member or rotor 2, and a peripherally disposed, stationary member or casing 3. Attached to the rotor 2, and located generally between the rotor 2 and the casing 3, are a plurality of blades 4.

Figure 2:
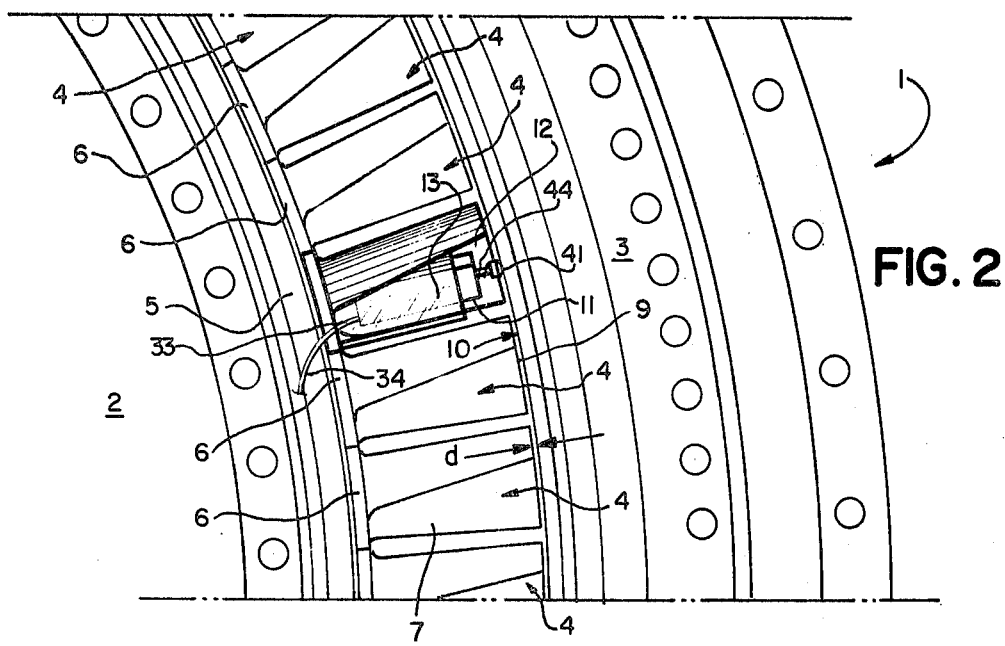
FIG. 2 is an enlarged, side elevational view of those portions of the turbine illustrated in FIG. 1 which are indicated by the reference numeral II.

FIG. 2 illustrates the relationship between the rotor 2, casing 3 and blades 4 in greater detail. As shown, each blade 4 is a separate unit which is capable of attachment to the rotor 2 by the retaining ring 5.

Each blade 4 generally comprises a base portion 6 and a contoured surface 7 which extends outwardly from the base 6 toward the casing 3. The base 6 is provided with appropriate means for attachment to the rotor 2 and for maintaining proper alignment between each blade 4 and the assembled unit. Upon assembly, a clearance d is developed between the tips 9 of the blades 4 and the inner wall 10 of the casing 3. It is this clearance d which must be properly measured and maintained to assure proper operation of the assembled turbine.

In order to measure the clearance d, a measuring device 11 is attached to at least one blade 12 associated with the rotor 2. In a preferred embodiment, this is accomplished using the retaining clip 13 best illustrated in FIGS. 3-5. It is generally preferred that the retaining clip 13 maintain the measuring device 11 in an orientation which is substantially radially disposed with respect to the rotor 2, so that only a single point of contact is maintained between the measuring device 11 and the inner wall 10, as will be more fully described below. Although substantial radial alignment of the measuring device 11 within the retaining clip 13 is preferred, such an orientation is not required so long as free and uninhibited operation of the measuring device 11 is permitted.

The retaining clip 13 generally includes a first surface or base 15 which is adapted for attachment to the contoured surface 7 of the blade 12, and a holder 16 which is associated with the base 15 and which provides a means for releasably engaging the measuring device 11 within a cavity 17 formed between the holder 16 and the base 15.

As shown in FIG. 3, the holder 16 generally includes a curved portion 18 and a substantially flat portion 19 which overlies the base 15. For reasons which will be described more fully below, the retaining clip 13 is formed of a material having resilient qualities, and which is capable of disintegration during operation of a completed, fully assembled turbine without adversely affecting the components comprising the assembled turbine. Such distintegration may include burning, breaking, fragmenting, melting, or any other means of removal which will not otherwise damage the components of the assembled turbine. The use of "Plexiglas V (811)", manufactured by the Rohm and Haas Company has been found to be suitable for this purpose.

The retaining clip 13 is readily attached to the blade 12 using an appropriate adhesive. Liquid cyanoacrylate adhesives may be used for this purpose, examples being 3M Scotch-Weld No. CA-5 or Locktite Superbonder No. 416. To facilitate proper attachment of the retaining clip 13 to the blade 12, the lower face 25 of the base 15 is preferably provided with a contour which substantially corresponds to that of the contoured surface 7 of the blade 12. This assists in maintaining a proper bond between the retaining clip 13 and the blade 12, and also assists in properly orienting the retaining clip 13 with respect to the blade 12.

Alignment of the retaining clip 13 with respect to the blade 12 may be performed in a variety of different fashions. For example, the terminating edge 27 of the base 15 may be provided with a depending edge portion 28 which serves as a stop which can be used to engage the trailing edge 29 of the contoured surface 7 of the blade 12, so that contact between the edge portion 28 and the trailing edge 29 serves to align the retaining clip 13 with respect to the blade 12. It is also possible to configure the contacting edge 26 of the retaining clip 13 so that contact between the edge 26 and the base 6 of the blade 12 will properly orient the retaining clip 13. These techniques may also be used in combination, if desired.

As is best illustrated in FIG. 3, the measuring device 11 is capable of being positioned within a cavity 17 defined between the portion 19 and base 15, securely maintaining the measuring device 11 in position. For additional security, ribs 20, 21 may be provided to engage peripheral edge portions of the measuring device 11. As shown, the rib 20 which is closest to the curved portion 18 of the holder 16 is somewhat larger and is preferably substantially uniform in height along its length. This provides a secure backing for the measuring device 11 which assists in its alignment as it is inserted within the cavity 17. The rib 21 which is farthest from the curved portion 18 is preferably somewhat smaller than the rib 20, and as shown in FIG. 4, preferably bevels downwardly from its leading edge 22 to a point 23 at which it substantially merges with the surface of the base 15. In this manner, the ribs 20, 21 combine with the portion 19 and base 15 to provide a channel for securely enclosing the measuring device 11. For reasons which will be more fully described below, and as is best illustrated in FIG. 5, location of the rib 21 preferably substantially corresponds with the terminating edge 24 of the portion 19, and the terminating edge 24 of the portion 19 includes a curved portion 47 located adjacent the base 6 of the blade 12.

To regulate extension of the measuring device beyond the cavity 17 of the retaining clip 13, and accordingly the tip 9 of the blade 12, a projection 30 may be provided which limits insertion of the measuring device 11 within the channel defined by the base 15, portion 19 and ribs 20, 21 (if used). In the embodiment illustrated, the projection 30 forms part of the base 15, however, the projection 30 may also be associated with other portions of the retaining clip 13 if desired, so long as an aperture or space is provided between the measuring device 11 and the base 6 of the blade 12, for purposes which will be more fully described below.

A variety of different measuring devices 11 may be used to measure the clearance d previously described. One such measuring device which has found particular utility in performing this measurement is a potentiometer, such as the "Linipot No. 2051414120.44" (or equivalent), manufactured by Bourns Instruments, Inc. Such potentiometers generally include (referring to FIG. 8) a substantially rectangular body 31, a shaft 32 which extends longitudinally through the body 31, and a plurality of connection leads 33 which extend from the body 31 for attachment to appropriate measuring equipment. The connection leads 33 are preferably grouped to form a cable 34, avoiding the need to accomodate separate wires. Such potentiometers are commercially available and do not form part of the present invention, however, appropriate modification of these potentiometers in accordance with the present invention is preferred.

For example, the cable 34 extends between the body 31 of the measuring device 11 and the measuring equipment which is used to monitor the clearance d. Since it is customary for the rotor 2 to be rotated through at least one full rotation (often several times) during a measurement operation, a significant length of cable 34 is required to assure a proper connection between the measuring device 11 and the externally located measuring equipment. Clearly, it is desirable that this cable 34 not be permitted to loosely dangle within the assembled unit 1, but rather, that this cable 34 be appropriately supported within the unit 1 as will be more fully described below. To provide this capability, a plurality of harness clips 35 may be used.

Figure 7:
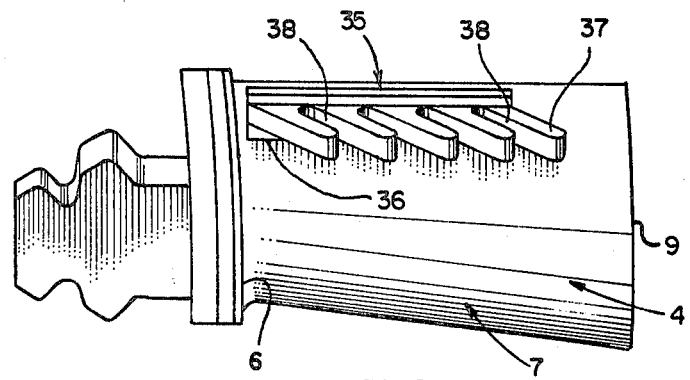
FIG. 7 is a top plan view of the blade and harness clip shown in FIG. 6.

As illustrated in FIGS. 6 and 7, one such harness clip 35 which may be used for this purpose generally comprises a base 36 which is adapted for attachment to the blades 4, and a plurality of spaced fingers 37 which extend outwardly from the base 36. The base 36 may be attached to the blades 4 as desired using an adhesive similar to that used in conjunction with the retaining clip 13. The spaced fingers 37 may assume a variety of different configurations, so long as appropriate cable engaging cavities 38 are provided. One configuration which has been found useful for this purpose is shown in FIGS. 6 and 7 and includes a series of fingers 37 which are substantially parallel to and spaced from each other, and which form an acute angle with the base 36 as shown. By providing more than one cable engaging cavity 38, the harness clips 35 may be used to engage the cable 34 each time it is caused to encircle the rotor 2. For this reason, the provision of multiple fingers 38 is preferred.

A second consideration regarding use of the potentiometer previously described is that the shaft 32 is generally free to move within the body 31. However, in measuring the clearance d, it is preferred that the shaft 32 not be permitted to contact or interfere with any structure comprising the unit 1 until the measuring device 11 is ready for use. It is therefore preferable to provide the measuring device 11 with a release mechanism.

Figure 8:
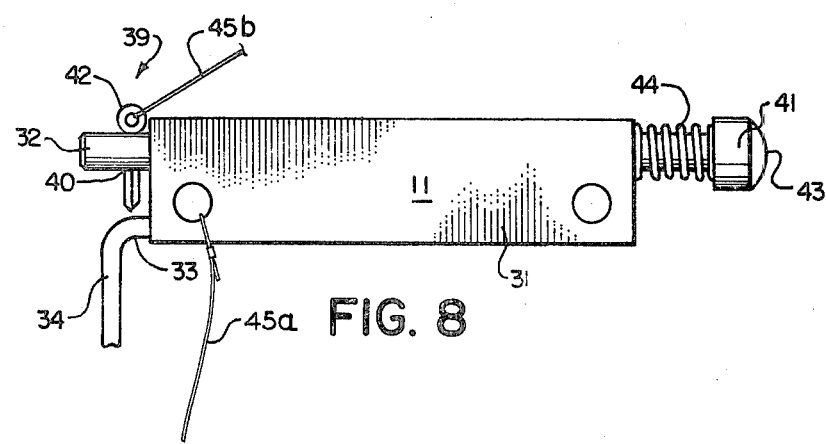
FIG. 8 is a top plan view of a measuring device adapted for use in conjunction with the present invention.

One such release mechanism, designated generally as 39, is illustrated in FIG. 8. As shown, the shaft 32 of a substantially conventional potentiometer is provided with a substantially diametrically disposed aperture 40 adjacent one end of the body 31, and a follower 41 adjacent the other end of the body 31. The follower 41 is provided with a curved terminating surface 43 which assists in preventing unwanted interference between the measuring device 11 and the the remainder of the unit 1, and which aids the measuring device 11 in smoothly traversing the inner wall 10 of the casing 3 during the measurement procedure. A spring 44 is positioned about the shaft 32 and between the body 31 and the follower 41 to bias the follower 41 into engagement with the inner wall 10 when a clearance measurement is to be obtained. The aperture 40 is adapted for engagement by a retaining pin 42, which serves to maintain the follower 43 in a retracted position until a clearance measurement procedure is to be performed.

The foregoing components may be used to measure the clearance d between the blades 4 of the rotor 2 and the inner wall 10 of the casing 3 as follows.

First, the components of the unit 1 are assembled. Generally, this involves securing the blades 4 to the rotor 2 in the conventional manner. During this procedure, a retaining clip 13 is attached to one of the blades 12 as previously described, preferably using an appropriate adhesive. Although only one retaining clip 13 need be used for this purpose, it is also possible to use a plurality of such retaining clips (and a series of measuring devices) if desired.

A measuring device 11 is then inserted within the cavity 17 of the retaining clip 13, orientation of the measuring device 11 within the cavity 17 being facilitated by cooperation between the ribs 20, 21, the projection 30, the base 15, the portion 19, and the body 31 of the measuring device 11. In so doing, the aperture developed by the projection 30 adjacent the body 31 of the measuring device 11 receives the end of the shaft 32, providing space for free movement of the shaft 32 during the measurement procedure. Since, as previously described, it is preferred that the shaft 32 and the follower 41 remain retracted during assembly of the unit 1, the retaining pin 42 is inserted through the aperture 40, retracting the shaft 32 and follower 41 against the tension of the spring 44.

To assist in performing the clearance measurement procedure, two ripcords are preferably attached to the measuring device 11 as follows. A first ripcord 45a is attached to the body 31 of the measuring device to provide a secure means for withdrawing the measuring device 11 from the cavity 17 after the measurement procedure has been completed. To permit removal of the retaining pin 42, and release of the shaft 32 for subsequent use, a second ripcord 45b is attached to the retaining pin 42.

As previously mentioned, it is customary to perform a cold clearance measurement as the rotor 2 progresses through at least one, if not several, rotations. To accommodate this, the ripcord 45a and the cable 34 are generally wrapped around the rotor 2 for several rotations, as shown in FIG. 1. To securely retain the ripcord 45a and the cable 34 in position, a series of harness clips 35 are attached to the blades 4 as desired, and the ripcord 45a and the cable 34 are then engaged by the cavities 38 of the harness clips 35. Lastly, the free ends of the ripcord 45a and the cable 34 are threaded through an appropriate aperture in the casing 3, such as the borescope hole 46 which is traditionally provided in the casing 3 to permit inspection of the blades 4 of an assembled unit 1. During this time, the ripcord 45b is allowed to extend freely from the retaining pin 42 as shown.

After the rotor 2 and casing 3 have been assembled, but before enclosure of the unit 1, the ripcord 45b is pulled, which releases the retaining pin 42, readying the measuring device 11 for subsequent use. The ripcord 45b and the retaining pin 42 are then withdrawn and removed from the assembled unit 1. The free end of the cable 34 is attached to appropriate measuring equipment, and assembly of the unit 1 is completed to the extent desired.

Measurement of the clearance d is then performed as follows. Since the shaft 32 of the measuring device 11 has been released, the follower 41 is biased into engagement with the inner wall 10 of the casing 3. At this time, the rotor 2 is rotated and suitable measurements are obtained from the measuring device 11 which indicate the clearance d. Also as the rotor 2 is rotated the cable 34 and the ripcord 45a are gradually withdrawn from within the unit 1 through the borescope hole 46. Measurement of the clearance d proceeds until the cable 34 and ripcord 45a are fully retracted, and the measuring device 11 is positioned adjacent the aperture in the casing 3. This represents completion of the cold clearance measurement procedure.

Lastly, since the measurement procedure is completed, it remains necessary to remove the measuring device 11 from within the assembled unit 1. To do so, the ripcord 45a is pulled so that the measuring device 11 is released from the cavity 17 of the retaining clip 13. Release of the measuring device 11 from the cavity 17 is facilitated by the resilient nature of the portion 19. To further facilitate release of the measuring device 11, the bevelled rib 21 and the curved edge 47 may be provided as previously described. Thereafter, the cable 34, the ripcord 45a and the attached measuring device 11 are withdrawn from within the assembled unit 1 through the borescope hole 46. As a result, all measuring equipment is removed from within the assembled unit 1, without requiring disassembly of the unit 1. At this stage, the retaining clip 13 and any harness clips 35 which have been used remain within the unit 1. However, since the clips 13, 35 are formed of a material which disintegrates upon operation of the completed turbine without adversely affecting the turbine components, these clips 13, 35 are removed from the blades to which they were attached when the completed turbine is initially fired.

It may therefore be seen that the foregoing method, and associated devices, serve well to satisfy the objectives previously set forth. A straightforward method is provided for performing a cold clearance measurement without having to disassemble the unit after the measurement has been made. This is performed simply, and without damage to turbine components. It will also be understood that the present invention is capable of variation.

For example, the configuration of the harness clip 35 may be varied, as may the configuration of the retaining clip 13 so long as the retaining clip 13 is provided with a means for holding the measuring device 11 to the blade 12 in a reliable and secure manner. Use of the ribs 20, 21 and the curved portion 47 are all optional. It is also clearly possible for the retaining clip 13 and the harness clip 35 to be formed of a variety of different materials, and for these elements to be attached to the blades using a variety of different adhesives.

Further, it is to be understood that the rotor 2, casing 3 and blades 4 illustrated in FIG. 1 merely represent an illustrative configuration in which these elements may be assembled, it being clearly understood that the method and apparatus of the present invention is also capable of use in conjunction with components and assembled units having other configurations as well. For example, the method and apparatus of the present invention may be used in conjunction with rotating assemblies such as fans, compressors, high and low pressure turbines, etc.

It is to be recognized that the method and apparatus of the present invention can be utilized to obtain measurement of relative as well as absolute clearances. More particularly, the output of the measuring device provides an electrical signal which corresponds to the relative clearance as the blade rotates. This relative clearance is useful in measuring concentricity. For those instances in which absolute clearance measurement is desired, those skilled in the art will recognize that the measuring device must be calibrated with a known reference so as to provide the absolute clearance measurement.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A retaining clip for engaging a device for use in measuring the clearance between a rotating member and a stationary member of a turbine, which retaining clip comprises:
    (a) a base; and
    (b) holder means for releasably engaging said measuring device and operatively associated with said base;

wherein said retaining clip is capable of disintegration during operation of said turbine without damaging said turbine.

2. The retaining clip of claim 1 wherein said holder means includes means for aligning said measuring device within said holder means.

3. The retaining clip of claim 1 wherein said retaining clip is adapted for attachment to a blade associated with said rotating member.

4. The retaining clip of claim 3 wherein the surface contour of the base which is attached to the blade is configured to correspond to the surface contour of the blade.

5. The retaining clip of claim 3 wherein said retaining clip further comprises stop means associated with said base and adapted to engage selected edge portions of said blade.

6. The retaining clip of claim 1 wherein said rotating member and said stationary member form an assembled combination.

7. The retaining clip of claim 1 wherein said holder means is resilient.

8. The retaining clip of claim 1 wherein portions of said holder means are maintained in a spaced relation to portions of said base, to define a region between said base and holder means for releasably engaging said measuring device.

9. The retaining clip of claim 8 wherein said retaining clip further comprises a plurality of ribs extending outwardly from said base and into said region to define a channel for receiving said device.

10. The retaining clip of claim 9 wherein one of said ribs is bevelled.

11. The retaining clip of claim 10 wherein at least a portion of said bevelled rib merges with the surface of said base.

12. The retaining clip of claim 11 wherein the terminating edge of said holder means is in substantial alignment with said bevelled rib.

13. The retaining clip of claim 12 wherein said terminating edge includes a curved portion located along an end portion of said retaining clip.

14. The retaining clip of claim 13 wherein said curved portion is located adjacent the portions of said bevelled rib which merge with the surface of said base.

15. The retaining clip of claim 3 wherein at least another blade associated with said rotating member is provided with a harness clip for use in supporting interconnections between said measuring device and measuring equipment located external to said stationary member, which harness clip comprises a base, and a plurality of fingers extending outwardly from said base.

16. The harness clip of claim 15 wherein said base is configured for attachment to said blade.

17. The harness clip of claim 15 wherein said fingers form an acute angle with said base and are substantially parallel to each other.

18. A method for measuring the clearance between a rotating member having a plurality of blades and a stationary member for enclosing said rotating member to form an assembled combination, said method comprising:
 (a) attaching a retaining clip to one of said blades;
 (b) locating a measuring device within said retaining clip so that said device is releasably engaged by said retaining clip;
 (c) connecting a harness means between said measuring device and remote measuring equipment through an aperture in said stationary member, while assembling said combination; and thereafter;
 (d) measuring said clearance while simultaneously rotating said rotating member of said assembled combination and withdrawing said harness means through said aperture; and thereafter,
 (e) releasing said measuring device from said retaining clip by pulling on said harness means;
 (f) withdrawing said harness means and attached measuring device from said assembled combination, through said aperture, without disassembling said combination; and thereafter,
 (g) removing said retaining clip from said blade by operation of a turbine comprising said assembled combination.

19. The method of claim 18 wherein the method further comprises the steps of:
 (a) attaching a plurality of harness clips to other of said blades; and
 (b) engaging, by said harness clips, portions of said harness means which extend between said measuring device and said aperture.

20. The method of claim 19 wherein said method further comprises the step of removing said harness clips from said other blades by operation of the turbine comprising said assembled combination.

21. The method of claim 18 wherein the performance of step (b) aligns said measuring device with respect to said blade and said stationary member.

22. The method of claim 21 wherein said measuring device further includes biasing means, and wherein said method further comprises the steps of:
 (a) maintaining said measuring device in a retracted mode, against the forces produced by said biasing means, during assembly of said combination; and
 (b) releasing said measuring device for operation after assembly of said combination.

23. An assembled combination including a rotating member having a plurality of blades associated therewith and a stationary member for enclosing said rotating member, and further comprising:
 (a) a retaining clip attached to one of said blades and including a base and a holder means operatively associated with said base;
 (b) a measuring device releasably engaged by said retaining clip; and
 (c) harness means extending through an aperture in said stationary member and between said measuring device and remote measuring equipment;
so that said measuring device can measure the clearance between said rotating member and said stationary member of said assembled combination and thereafter be removed from said retaining clip and from within said assembled combination, after said measurement has been performed, without disassembling said combination, and so that said retaining clip can be removed from said blade by operation of a turbine comprising said assembled combination.

24. The assembled combination of claim 23 wherein said assembly further comprises a plurality of harness clips attached to other of said blades and adapted to engage said harness means.

25. The assembled combination of claim 23 wherein said measuring device is engaged by said retaining clip so that said measuring device is substantially radially disposed along said blade.

26. The assembled combination of claim 23 wherein said measuring device comprises:
 (a) potentiometer means for developing signals representing said clearance; and
 (b) biasing means operatively associated with said potentiometer means and adapted to bias portions of said potentiometer means toward an extended position.

27. The assembled combination of claim 26 wherein said device further comprises means for retaining said portions of said potentiometer means in a retracted position in a first mode of operation.

28. The assembled combination of claim 27 wherein said measuring device further comprises means for releasing said portions of said potentiometer means from said retracted position in a second mode of operation.

* * * * *